United States Patent Office 2,862,901
Patented Dec. 2, 1958

2,862,901

AQUEOUS SOLUTION OF AMINO-ALDEHYDE RESIN AND POLYMER HAVING FORMALDEHYDE REACTIVE CARBOXAMIDE SUBSTITUENTS AND PROCESS OF PREPARATION

Tzeng Jiueq Suen, New Canaan, and Yun Jen, Stamford, Conn., assignors to American Cyanamid Company, New York, N. Y., a corporation of Maine No Drawing. Application March 26, 1956
Serial No. 573,601

11 Claims. (Cl. 260—29.4)

The present invention relates to novel water-soluble, cationic, thermosetting resinous compositions and their preparation.

An object of the invention is to provide improved resin compositions.

Another object of the invention is to provide water-soluble cationic resins which are substantive to negatively charged materials and which may be substantially permanently attached thereto by curing to the water-insoluble state.

A further object of the invention is to provide improved ion exchange resins.

Still another object of the invention is to provide improved coagulating and precipitating agents.

Other objects and advantages of the invention will be apparent to those skilled in the art from the disclosure hereinbelow.

The present invention is concerned with aqueous solutions of cationic thermosetting resinous condensates containing a chemical combination of formaldehyde, a cationic amino compound reactive with formaldehyde to form resins, and a water-soluble polymer having formaldehyde-reactive carboxamide substituents attached to a substantially linear carbon chain. The invention also includes various methods of preparing these resinous condensates. Narrower aspects of the invention relate to the preferred ratios of amino resin to linear polymer constituents and the degree of substitution of the linear polymer chain with said carboxamide substituents.

The carboxamide polymers referred to as one of the primary raw materials for synthesizing the novel resin condensates are water-soluble linear carbon chain polymers with at least 5% of the chain carbon atoms carrying a formaldehyde-reactive carboxamide substituent either attached directly thereto or indirectly as through an aryl or alkyl group. Suitable polymers may be formed by the homopolymerization or copolymerization of such water-soluble monomers as acrylamide, methacrylamide, itaconamide, and their corresponding N-substituted water-soluble derivatives such as N-methyl acrylamide, N-methyl methacrylamide and N-2-hydroxyethyl methacrylamide. Such polymers are water-soluble and 50% of their linear carbon atoms carry one formaldehyde-reactive carboxamide substituent each. Water-soluble linear carbon chain polymers may be employed wherein the chain carbon atoms may carry a variety of substituents as, for example, those formed by copolymerizing acrylamide or N-methylol acrylamide with an $\alpha,\beta$-unsaturated monomer which is copolymerizable therewith, such as styrene, vinyl chloride, vinyl acetate, methyl acrylate, methyl vinyl ketone, methyl isopropenyl ketone, p-vinylbenzamide, acrylonitrile, p-methoxystyrene, p-chloromethylstyrene, and crotonaldehyde or mixtures thereof, whereby a linear carbon chain is formed carrying such essentially nonionic substituents as nitrile, halogen, esters, ketone, and aldehyde groups. By hydrolysis, some or all of the ester groups introduced by compounds such as vinyl acetate can be converted to hydroxyl groups which also are nonionic. While linear polymers bearing substituents of a nonionic nature on their carbon chains are preferred as constituents of the present condensates, the invention is not limited to this class of reactants. These addition polymers may contain substantial numbers of anionic radicals as substituents on the carbon atoms in the chains. This, of course, will reduce the positive charge on the molecules of the product of condensation with the cationic amine-aldehyde resin, but such effect can be counterbalanced by increasing the quantity of amine resin relative to the addition polymer reactant.

The addition polymer reactant of the novel compositions is essentially linear in nature but there may be a substantial amount of branching of the carbon to carbon linkages in the polymer chains provided that there is no significant cross-linking between carbon chains with formation of three-dimensional and insoluble polymers. Thus they may be aptly described as having substantially linear carbon chains.

In preparing the aforementioned polymers, it is necessary that at least about 1 linear carbon atom out of every 20, that is about 5% of the chain carbon atoms, carry an aldehyde-reactive carboxamide group. A considerably higher frequency is preferred for many purposes, that is 25% or more. A higher degree of substitution up to about 75% may be effected by the use of polycarboxamide monomers as exemplified by the copolymerization of 1 mol of methacrylamide with 1 mol of fumaramide which results in formation of a polymer with 75% of the carbon chain atoms carrying one carboxamide group each. It is evident that the corresponding linear carbon chain sulfonamides are equivalents for the corresponding carboxamides and thus are included within the scope of the present invention.

The addition polymerization may be performed in any desired manner using an organic or aqueous medium, the latter generally being preferred. Particularly good results have been obtained by continuous polymerization in an aqueous medium in the presence of a peroxygen compound-type catalyst either alone or in redox systems. The details of such polymerization reactions are too well known to warrant repetition here. The products obtained from aqueous polymerizations may contain a small proportion of carboxyl groups resulting from hydrolysis of amide groups. Any anionic charge thereby acquired by the polymer molecule is negligible and it is wholly overcome later by reaction with the cationic constituent of the resin condensates.

The polymerization is controlled in known manner (e. g,. with chain transfer agents, etc.) to produce a polymer having a molecular weight of at least 10,000. The maximum useful molecular weight is somewhat below the molecular size at which the material starts to be difficultly soluble. The viscosity of such material, however, is inconveniently high and in practice, therefore, we prefer the molecular weight to be between about 10,000 and 3,000,000.

The second principal constituent of the resins of the present invention is a water-soluble cationic thermosetting amino-aldehyde resin. Such resin may be in either essentially monomeric or colloidal state (that is, a low order polymer or water-soluble partially polymerized stage) when reacted with the linear carbon chain carboxamide; it thus may have a molecular weight between about 500 and 3,000,000. Suitable cationic amine resins include melamine-formaldehyde resins and melamine-urea formaldehyde resin preferably in the advanced or acid colloid forms disclosed in U. S. Patents Nos. 2,345,543, 2,485,079 and 2,485,080; the aminoalkyl urea resins of U. S. Patent No. 2,698,787; the colloidal ammeline-formaldehyde resins of U. S. Patent No. 2,356,719; the dicyandiamide-formaldehyde and biguanide-formaldehyde resins of U. S. Patent 2,497,074; the urea-formaldehyde-polyalkylenepolyamine, guandine guanylurea resins of U. S. Patent No. 2,545,575; and the linear carbon chain poly-ureido resins of U. S. Patent No. 2,616,874. The foregoing resins all contain suitable amounts of combined formaldehyde for direct condensation with the carboxamide linear polymers described above. Of these, the unmodified and modified melamine resins are preferred, both the unalkylated and the alkylated varieties, containing from 1 to 6 mols of combined formaldehyde, preferably 2 to 5, and from 1 to 6 mols of combined methanol per mol of melamine. Among the examples of modified melamine-formaldehyde resins are those reacted with polyalkylene polyamines like tetraethylene pentamine and the reaction products of said polyamines with difunctional halohydrins as described in applications Serial Nos. 343,971, now U. S. Patent 2,769,799, and 343,792, now U. S. Patent 2,769,796.

Also, one may employ the aliphatic polyamine-halohydrin resins of U. S. Patent No. 2,573,956; the ammonia-epichlorohydrin resin of U. S. Patent No. 2,573,957, and polyethylenimine resins. Resins of this type may first be condensed with formaldehyde and then reacted with the linear chain carboxamide, or with a mixture of formaldehyde and the linear chain carboxamide. It appears immaterial whether the formaldehyde first reacts with the carboxamide or with the amine compound.

Both the linear polymer and the cationic amino-formaldehyde resin reactants must be water-soluble. The latter term is used in its broader sense herein to include compounds which are dispersible in water without the employment of emulsifiers or dispersing agents and without displaying any tendency to settle in an hour or two. Thus it applies to colloidal solutions exhibiting the Brownian movement and Tyndall effect as well as true solutions.

The linear carbon chain carboxamide and cationic amino-aldehyde resin are most easily condensed by mixing aqueous solutions or dispersions of the two to form a reaction mixture containing 10%–35% by weight of resin solids, any unreacted formaldehyde present being calculated as a resin solid. The condensation usually takes place at room temperature as is evidenced by development of a very substantial increase in the viscosity of the liquid and is accelerated by heat. The reaction is preferably terminated when it is just short of the gel stage as may be determined by laboratory trial, the reaction speed varying considerably depending on the particular reagents employed, their concentration, and the pH and temperature. Suitable methods of termination are diluting the solution with water to less than 5% solids content and cooling the solution to substantially below room temperature and sometimes by neutralization.

Although the above method is preferred and may be used with all of the cationic resins and linear polymers described herein, other preparatory methods are also suitable in many cases. The essential constituents are formaldehyde, the linear formaldehyde-reactive carboxamide polymer and a cationic amine capable of reacting with formaldehyde to form a water-soluble cationic thermosetting resin. Other preparatory methods include introducing and reacting these three components in a single solution; methylolating the linear polymer with formaldehyde (polymethylolacrylamide, etc.) as a formaldehyde donor and then reacting this product with the cationic amine; polymerizing N-methylolacrylamide as a formaldehyde donor and then reacting it with the cationic amine; and reacting both the polymer and the amine separately with formaldehyde and then reacting the intermediates with one another.

Ammonia-epichlorohydrin and polyalkylene-polyamine epichlorohydrin high molecular weight adducts, for example, may be reacted with polymethylolacrylamide to form the novel resinous condensates.

According to a somewhat different method the carboxamide polymer is mixed with the components of the cationic resin, so that formation of the resin and condensation of the resin with the carboxamide polymer take place in one solution. Thus the carboxamide polymer may be mixed with such materials as trimethylol melamine, dimethylol urea, dimethylol guanidine, dimethylol thiourea and mixtures thereof, with about 10% of a polyalkylene-polyamine like diethylene triamine based on the weight of the foregoing, and reacted with a slight excess of formaldehyde over that stoichiometrically necessary to introduce one methylol group into each formaldehyde-reactive nitrogen atom present.

The resins are condensed in suitable proportion to result in the development of a unitary hydrophilic cationic resinous condensate which is substantive to cellulose and other negatively charged materials in aqueous media. Too little of the cationic amine-aldehyde resin per unit weight of the linear carbon chain carboxamide results in a resin which is so weakly cationic that it is at best only poorly adsorbed by negatively charged substances. In practice, useful results consonant with the above are generally obtained when the carboxamide polymer and cationic resin are condensed within the weight ratios of about 1:10 and about 10:1, the optimum results being usually obtained with weight ratios between about 1:2 and about 2:1.

Much remains to be learned of the structure of the novel condensates described herein. So while it may be postulated that a methylol group attached to either an amino nitrogen atom of the cationic amino resin reacts with a hydrogen atom attached to an amido nitrogen of the linear polymer, or vice versa, with one molecule of water being split off to form a methylene bridge between these two nitrogen atoms; the present invention is not limited to any particular theory. The reaction product is a thermosetting resin, with the linear polymer firmly bound therein, which cures to the insoluble three-dimensional state.

For a better understanding of the nature and objects of this invention, reference should be had to the accompanying illustrative examples in which all parts are given in terms of weight unless otherwise stated therein.

*Example 1*

Trimethylol melamine is dissolved in water along with hydrochloric acid, and an aqueous colloidal solution of cationic partially polymerized trimethylol melamine particles displaying the Tyndall effect is prepared with a content of 12% resin solids by aging in hydrochloric acid in the manner disclosed in Patent No. 2,345,543. To 41.7 parts of the colloidal solution are added 50 parts of a 10% aqueous solution of polyacrylamide having a molecular weight of approximately 250,000. No exotherm is observed as this mixture reacts at room temperature for a period of one hour. Then the reaction is substantially halted by mixing in 908 parts of water to dilute the mixture to about 1% resin solids. It is noted that the viscosity of this 1% resin syrup is distinctly higher than that of 1% solutions of each reactant separately. Electrophoresis experiments indicate the resin being cationic as evidenced by the migration of resin particles to the cathode.

A suspension of 5 parts of diatomaceous earth in 200 parts of demineralized water is formed by simple stirring. After standing for one hour without agitation, a portion of the solids are still suspended and a supernatant liquid is cloudy. Then 0.025 part of a 1% solution of trimethylol melamine in noncolloidal form is stirred into the same suspension and allowed to stand for one hour. No change is observed in the settling characteristics of this suspension. The experiment is repeated with additional samples of the same quantity of this suspension using 0.025 part of a 1% solution of the aforesaid hydrochloric acid colloid of trimethylol melamine in one sample, with 0.025 part of a 1% solution of the aforesaid polyacrylamide solution in another sample and also by adding separately 0.0125 part of 1% solutions of the aforesaid melamine acid colloid and of the polyacrylamide separately to a third sample. Again no significant change is observed in the settling of these three suspensions after standing one hour. However, upon repeating the experiment with 0.025 part of a 1% solution of the reaction product of the polyacrylamide and the colloidal melamine resin, a striking difference is noted in that all of the solid material settles, leaving a clear supernatant liquid within 30 seconds after the stirring ceases. This indicates that the product prepared according to this example is a reaction product rather than a simple mixture and further that it has a strong flocculating effect even in low concentrations.

Example 2

A uniform solid mixture of 8.35 parts of polyacrylamide and 5 parts of trimethylol melamine is made and then dissolved with efficient agitation in 85 parts of water. The particular acrylamide polymer used here has a viscosity of 77,000 centipoises at a concentration of 20% by weight in water at 25° C. To the above polyacrylamide-melamine resin solution are added 3.3 parts of 18% hydrochloric acid and the acidified mixture is then allowed to react at room temperature for two hours. A viscose syrup is obtained which exhibits the Tyndall effect. It is found that further reaction is inhibited by diluting a sample of the syrup to a concentration of 4% resin solids or less. A piece of chrome-tanned cowhide is immersed for one-half hour in another portion of the product after dilution to 6% resin solids. It is observed that the colloidal resin is substantive to the leather and that the resin solution tends to become exhausted. After drying, the treated hide is found to have a considerable fuller and firmer hand than an untreated piece.

Example 3

An aqueous solution is made up using 142 parts of a 10% solution of polyacrylamide, which solution has a viscosity of 1980 centipoises at 25° C., 38 parts of dimethylol melamine and 22 parts of water. The pH of the solution is adjusted to 9.7 with 0.1 part of sodium carbonate and 1 part of 20% aqueous sodium hydroxide solution. The resin and polymer are reacted by heating at 40° C. for two hours and then cooling to room temperature. The product is a turbid resin syrup.

Example 4

A 37% aqueous formaldehyde solution weighing 40.5 grams is added to 178 grams of a 20% aqueous polyacrylamide solution having a viscosity of 10,400 centipoises at 25° C. with thorough mixing and the pH is raised to 8.7 using 2.5 parts of $Na_3PO_4 \cdot 12H_2O$ and 0.4 cc. of 20% aqueous sodium hydroxide. These materials are reacted at 60° C. for one hour, then 24 grams of guanidine hydrochloride are added and this solution acidified to pH 2. The reaction product forms a gel in about 15 minutes. After curing at 110° C. for two hours, the gel is colorless and has a high anion-exchange capacity.

Example 5

A condensation product of polyacrylamide with a urea-formaldehyde-polyalkylenepolyamine resin in 1:1 weight ratio is obtained by mixing 8.9 g. of a 37.5% aqueous urea-formaldehyde-triethylene tetramine resin prepared according to Example 1 of U. S. Patent No. 2,554,475 (3.3 g. resin solids), 28.3 g. of a 17.4% aqueous solution of polyacrylamide (6.6 g. polyacrylamide) with a molecular weight of about 250,000. The mixture is diluted to 6.9% solids with water, adjusted to pH 1.8 with concentrated hydrochloric acid, and allowed to react for 18 hours at room temperature, 6 hours at 40° C. and 18 hours at 22° C. From previous experience, it is known that the mixture is close to the gel point, and the reaction is stopped by diluting the mixture at 1% solids with water.

Example 6

To obtain the condensation product of polyacrylamide with a cationic urea-formaldehyde-polyalkylenepolyamine condensate in 2:1 weight ratio, the procedure of Example 5 is repeated except that only half the amount of urea-formaldehyde-triethylene tetramine resin is used and the solution is reacted for 18 hours at room temperature. A viscous resin syrup is produced.

Example 7

A modified melamine resin is prepared by heating a mixture of 252 parts of melamine and 1620 parts of 37% aqueous formaldehyde at 75° C.; adding 120 parts of 3-3'-iminobispropylamine and 90 parts of 37.5% hydrochloric acid; then maintaining the mixture at 70° C. until its viscosity reaches I using the Gardner-Holdt method; adding 50 parts of sodium hydroxide and 1296 parts of 37% aqueous formaldehyde; cooling to room temperature, and diluting to 12% solids with water.

A mixture is made from 16.7 ml. of the syrup thus obtained and 49.2 g. of a 4% aqueous polyacrylamide with a molecular weight of approximately 800,000. The mixture is allowed to react for one hour at a pH of 2.0, diluted to 2% solids, allowed to react overnight, and then diluted to 1% solids to obtain a thermosetting cationic of a high molecular weight polyacrylamide with a cationic melamine-formaldehyde-polyalkylenepolyamine resin in 1:1 weight ratio.

Example 8

The following illustrates the preparation of the condensation product of equal parts by weight of polyacrylamide with a methylol ureido derivative of polyalkylenepolyamine.

A high molecular weight polymer is prepared by gently refluxing a mixture of 31.7 parts of ethylene dichloride, 20.2 parts of water, and 53.1 parts of 3,3'-iminobispropylamine, cooling being applied at the outset to control the exothermic reaction. After 90 minutes of refluxing, 81.2 parts of water are added, at which point the viscosity of the syrup is B–D (Gardner-Holdt method). The mixture is cooled to 37° C. and 65.4 parts of 32% hydrochloric acid are added with cooling to maintain the temperature below 75° C. After cooling again to 37° C., 104 parts of potassium cyanate are added and the temperature of the mixture is maintained at 75° C. for 30 minutes whereby carbamyl groups are introduced. The polyureido derivative of the polyalkylene polyamine thus formed is methylolated by adding 117 parts of water along with 197 parts of 37% aqueous formaldehyde and reacting at 70° C. for 90 minutes. After diluting the reaction mass to 12% solids by weight with water, it is cooled to room temperature.

To 49.2 g. of a 4% aqueous solution of polyacrylamide having a molecular weight of 800,000 is added 17.7 g. of the above syrup. The mixture is condensed at pH 4 in the same manner as in Example 7 to produce a condensate of equal weights of polyacrylamide with a high molecular weight, linear, methylolated, polyureido derivative of a polyalkylene polyamine.

Example 9

The following illustrates a condensation reaction in which the required formaldehyde is introduced in combination with the polyacrylamide rather than the cationic amine.

To 189 g. (1 mol) of tetraethylenepentamine in 500 g. of water is slowly added 178 g. (3 mols) of epichlorohydrin with stirring, the temperature being maintained below 50° C. Stirring is continued until the solution becomes viscous, then the solution is diluted with water to 15% solids.

50 cc. of the solution is condensed by standing overnight at 20° C. and a pH of 9 with 50 cc. of a 15% polymethylol polyacrylamide solution, previously prepared by reacting polyacrylamide with 1 mol of formaldehyde per monomer unit present. The viscous syrup is then diluted to 2% solids with water.

The above water-soluble resins possess wide utility as adhesives; ion exchange resins; in the treatment of textiles, fibers, yarns, threads, knitted fabrics, woven cloth, as well as felted and non-woven fabrics; in treating leather; and as clarifying agents due to their rapid coagulating and settling effect on solids suspended in aqueous media. By reason of their cationic nature, they are substantive to and tend to exhaust from aqueous solutions onto negatively charged substances. This renders them very effective in dilute solutions. Inasmuch as the novel resins are thermosetting or heat-convertible to the insoluble three-dimensional state, they produce durable or substantially permanent effects on textiles, leather, etc., which are highly resistant to removal by dry cleaning.

While there are above disclosed only a limited number of embodiments of the compositions and processes of the invention herein presented, it is possible to produce still other embodiments without departing from the inventive concept herein disclosed, and it is desired, therefore, that only such limitations be imposed on the appended claims as are stated therein, or required by the prior art.

We claim:

1. A composition of matter which comprises an aqueous solution of a water-soluble cationic thermosetting amino-aldehyde resin, and a water-soluble polymer having at least 5% formaldehyde-reactive carboxamide substituents attached to carbon atoms in a substantially linear chain obtained by the polymerization of an ethylenically unsaturated amide and wherein the resin:polymer weight ratio is between about 1:10 and 10:1.

2. A composition according to claim 1 in which said aminoaldehyde resin comprises melamine-formaldehyde and said polymer comprises acrylamide units.

3. A composition according to claim 1 in which said resin comprises a polyamine-modified melamine and said water-soluble polymer comprises acrylamide units.

4. A composition of matter which comprises an aqueous solution of a water-soluble cationic thermosetting resinous condensate of a water-soluble cationic melamine-formaldehyde resin with a water-soluble polymer having formaldehyde-reactive carboxamide substituents attached to at least about 5% of the carbon atoms in a substantially linear carbon chain obtained by the polymerization of an ethylenically unsaturated amide and wherein the resin:polymer weight ratio is between about 1:10 and 10:1.

5. A composition of matter which comprises an aqueous solution of a water-soluble cationic thermosetting resinous condensate of a water-soluble cationic polyamine-modified melamine-formaldehyde resin with a water-soluble polymer having formaldehyde-reactive carboxamide substituents attached to at least about 5% of the carbon atoms in a substantially linear carbon chain obtained by the polymerization of an ethylenically unsaturated amide and wherein the resin:polymer weight ratio is between about 1:10 and 10:1.

6. A composition of matter which comprises an aqueous solution of a water-soluble cationic thermosetting resinous condensate of a water-soluble cationic melamine-formaldehyde resin with a water-soluble polymer having formaldehyde-reactive carboxamide substituents attached to at least about 25% of the carbon atoms in a substantially linear carbon chain obtained by the polymerization of an ethlenically unsaturated amide and wherein the resin:polymer weight ratio is between about 1:2 and 2:1.

7. A composition of matter which comprises an aqueous solution of a water-soluble cationic thermosetting resinous condensate of a water-soluble cationic polyamine-modified melamine-formaldehyde resin with a water-soluble polymer having formaldehyde-reactive carboxamide substituents attached to at least about 25% of the carbon atoms in a substantially linear carbon chain obtained by the polymerization of an ethylenically unsaturated amide and wherein the resin:polymer weight ratio is between about 1:2 and 2:1.

8. A process which comprises forming an aqueous solution of a water-soluble cationic thermosetting resinous condensate by reacting a water-soluble thermosetting amino-aldehyde resin, and the water-soluble polymer having at least 5% formaldehyde-reactive carboxamide substituents attached to carbon atoms in a substantially linear chain obtained by the polymerization of an ethylenically unsaturated amide and wherein the resin:polymer weight ratio is between about 1:10 and 10:1.

9. A process which comprises forming an aqueous solution of a water-soluble cationic thermosetting resinous condensate by reacting a water-soluble melamine-formaldehyde resin with polyacrylamide in aqueous solution in a resin:polyacrylamide weight ratio between about 1:10 and 10:1.

10. A process which comprises forming an aqueous solution of a cationic thermosetting resinous condensate by reacting a water-soluble polyamine-modified melamine-formaldehyde resin with polyacrylamide in aqueous solution in a resin:polyacrylamide weight ratio between about 1:10 and 10:1.

11. A proess which comprises forming an aqueous solution of a cationic water-soluble thermosetting resinous condensate by reacting a cationic water-soluble melamine-formaldehyde resin with a water-soluble polymer having formaldehyde-reactive carboxamide substituents attached to at least about 25% of the carbon atoms of a substantially linear carbon chain obtained by the polymerization of an ethylenically unsaturated amide in an aqueous medium in which the resin:polymer weight ratio is between about 1:2 and 2:1.

References Cited in the file of this patent

UNITED STATES PATENTS

| | | |
|---|---|---|
| 2,536,050 | Fluck | Jan. 2, 1951 |
| 2,554,475 | Suen et al. | May 22, 1951 |
| 2,769,796 | Suen et al. | Nov. 6, 1956 |

UNITED STATES PATENT OFFICE
CERTIFICATE OF CORRECTION

Patent No. 2,862,901                                      December 2, 1958

Tzeng Jiueq Suen et al.

It is hereby certified that error appears in the printed specification of the above numbered patent requiring correction and that the said Letters Patent should read as corrected below.

Column 3, line 19, for the serial number "343,971" read -- 343,791 --; column 5, line 36, for "considerable" read -- considerably --; column 6, line 2, for "mixture at" read -- mixture to --.

Signed and sealed this 12th day of May 1959.

(SEAL)
Attest:

KARL H. AXLINE                                                ROBERT C. WATSON
Attesting Officer                                         Commissioner of Patents